US008601596B2

(12) United States Patent
Wu et al.

(10) Patent No.: US 8,601,596 B2
(45) Date of Patent: Dec. 3, 2013

(54) USING SOCIAL SIGNALS TO IDENTIFY UNAUTHORIZED CONTENT ON A SOCIAL NETWORKING SYSTEM

(75) Inventors: Yunnan Wu, Palo Alto, CA (US); Peter Avelino Ruibal, Palo Alto, CA (US); Matthew Knight Jones, Redwood City, CA (US); Clement Genzmer, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 112 days.

(21) Appl. No.: 13/325,043

(22) Filed: Dec. 13, 2011

(65) Prior Publication Data

US 2013/0152211 A1    Jun. 13, 2013

(51) Int. Cl.
*H04L 29/06*    (2006.01)

(52) U.S. Cl.
USPC .................................. 726/26; 726/1; 726/30

(58) Field of Classification Search
None
See application file for complete search history.

(56) References Cited

U.S. PATENT DOCUMENTS 8,311,950 B1 *  11/2012  Kunal et al. ................... 705/319

* cited by examiner

*Primary Examiner* — Benjamin Lanier
(74) *Attorney, Agent, or Firm* — Fenwick & West LLP

(57) ABSTRACT

A prediction is calculated to determine whether a content item posted on a social networking system infringes on copyrights or otherwise violates the system's terms of use. The predictions are generated using social signals that are based on social information surrounding the content item, such as the density of connections between the posting user and the viewing users, the profile information of the users, and the geographical separation between the users. The content item is disabled if the prediction indicates a violation and the violation can be verified.

24 Claims, 6 Drawing Sheets

USING SOCIAL SIGNALS TO IDENTIFY UNAUTHORIZED CONTENT ON A SOCIAL NETWORKING SYSTEM

BACKGROUND

This invention relates generally to social networking, and in particular to using social activity to predict copyrighted material, abusive content, or any other unauthorized content that is posted on a social networking system.

Any system that enables users to share content with each other must deal with users who share unauthorized and abusive content. Examples of unauthorized content may include anything that violates the system's terms of use, such as pornography, gratuitous violence, or copyrighted work. Other content sharing systems have used information specific to the content to detect potential abuse. For example, video sharing websites may give users the option to flag a video for review if they find it offensive or suspect it violates intellectual property laws. This method is not always successful in detecting unauthorized content items, which leaves the company behind the system liable to legal action such as copyright infringement lawsuits.

With the rise in popularity of social networking systems, users have been voluntarily divulging more of their personal information, such as their friends, geographic location, preferred television shows and movies, hobbies, and activities to social networks. Social networking systems also generate additional information about each of its users based on their actions within the social network, such as their communication with other users and the content they consume. While all of this information is recorded and stored, it has not been used to predict the nature of any content items that users interact with.

In particular, the social activity surrounding a piece of content on a social network has not been used to predict whether the content is unauthorized. Any new method of detecting and disabling unauthorized content like copyright infringement or pornography is important to social network administrators who wish to minimize legal liabilities and maintain a clean and controllable user experience. Although the data is available on the social networking system, existing tools to detect unauthorized content do not use the social activity surrounding a content item.

SUMMARY

Embodiments of the invention use social signals surrounding a content item that is posted on a social networking system to determine whether the content item constitutes an unauthorized use of the social networking system. Specifically, the signals may be used to predict unauthorized content, such as whether the content is copyrighted material or abusive content and/or otherwise violates the social networking system's terms of use. For example, the social networking system may collect social signals about the content such as the diversity of the viewers of the content, the relationship between the viewers and another user or other entity that is featured or tagged in the content, and the relationship between the viewers and the user who posted the content. The social signals are then used to calculate a series of aggregated metrics to generate a prediction for whether the content is an unauthorized use of the social networking system.

In one embodiment, the process is a computer implemented algorithm that collects aggregate social data related to users of an internet-based social networking system who have viewed a video that was uploaded by another user. The process then analyzes any combination of the social signals mentioned above to predict whether the video contains copyrighted material. The process may use a machine learning algorithm to improve the accuracy of the prediction using the social signals. Responsive to identifying content that is likely to contain copyrighted material, the social networking system may remove the content immediately, pass the content along for further review, or otherwise process the suspected content according to the system's policies. In addition to detecting copyrighted material, this process may also be used to predict other types of unauthorized content.

The features and advantages described in this summary and the following detailed description are not all-inclusive. Many additional features and advantages will be apparent to one of ordinary skill in the art in view of the drawings, specification, and claims thereof.

Figure 1:
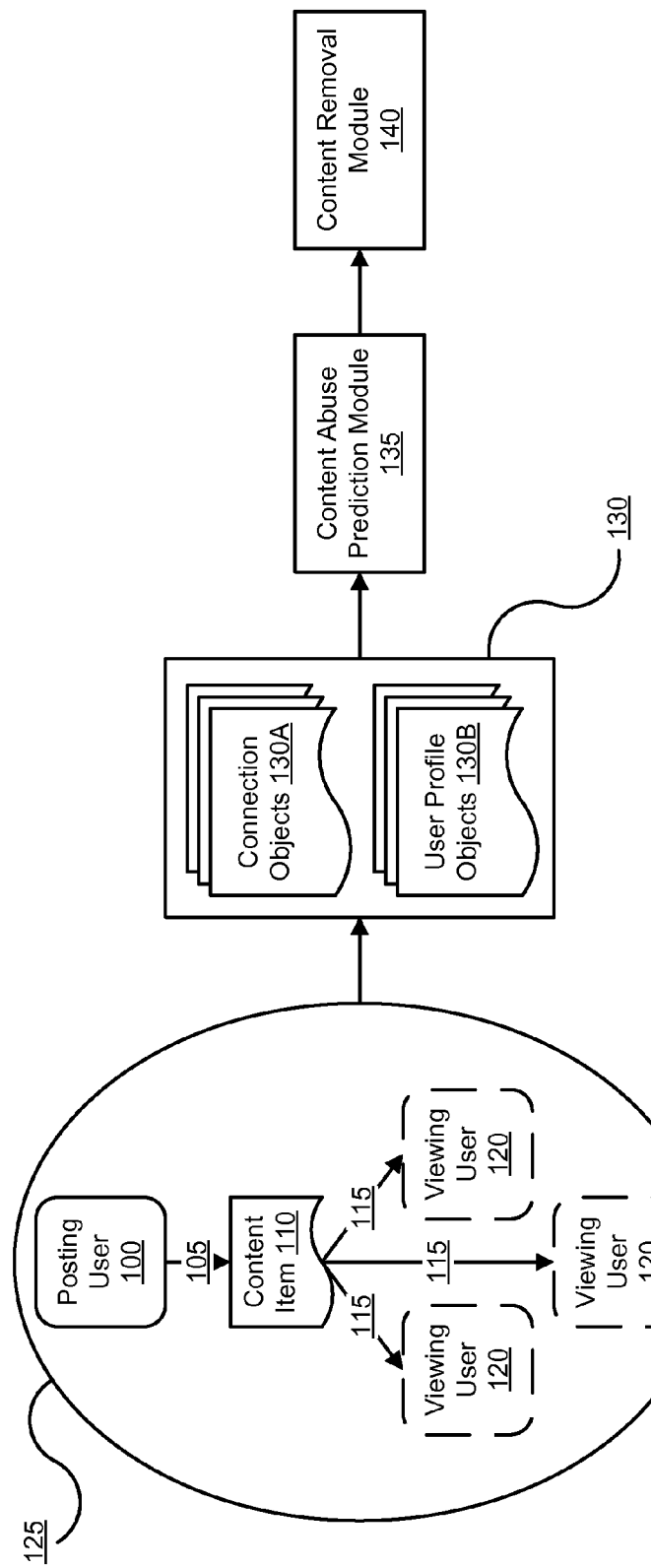
FIG. 1 is a high-level diagram illustrating a process for predicting whether a content item on a social networking system violates the system's terms of use and determining whether to remove the content item from the system, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system allows users to share information with each other. Users may join the social networking system and voluntarily provide the system with personal details such as their age, gender, date of birth, preferred movies and television shows, hobbies, educational background, and employment information. These details are saved in a user profile on the social networking system and are viewable by other users subject to any privacy settings that the user applies to his or her profile information. It is also possible to form connections between user profiles. Users can request to add connections to other users, and the connection is formed with the consent of the other user. Users may also form connections with pages that represent common interests, such as activities, movies, television shows, authors, books, and geographical destinations. Connections to pages are one-way and do not require the consent of the page. The set of data that represents user profiles, pages, and the connections that link them together can be referred to as a "social graph."

In addition to the information that users provide voluntarily, the social networking system can also record and generate additional information about its users, such as their communications with other users, how frequently they view certain pages or user profiles, their client device information, and their interactions with applications that operate on the social networking system. The social networking system can also record the user's browsing activity on external websites as long as those websites were accessed through links posted on the network. All of this additional information is also recorded in connection with the user's profile and can be used to supplement the information that the user provides voluntarily. For example, some users decline to list their preferred movies and television shows on their profiles, but the social networking system can predict their preferences by recording the applications, pages, and external websites that they interact with while they use the social networking system. By combining all of this information, the social networking system can construct a detailed profile of each user's interests, friends, location, and other personal details.

Another feature of the social networking system is the ability for users to post content items that can be retrieved and viewed by other users. Examples of content items include text, images, links to external web pages, and videos. The ability to post content items is intended to allow users to customize their profiles with personalized multimedia such as photographs, home movies, or links to web pages and news articles that they wish to share with other users. Users who post content items also have the option of tagging other users or entities in a content item to indicate that the content item is somehow related to the tagged users or entities. Some users abuse the content posting feature by posting content items that infringe on copyright laws or otherwise violate the social network's terms of use. For example, users might use the content sharing feature to post chapters from popular novels, episodes of television shows, or links to web pages on external domains that might contain similar copyrighted content.

FIG. 1 illustrates a high-level diagram of a process for predicting whether a content item that is posted on the social networking system infringes on copyright laws or otherwise violates the system's terms of use, in one embodiment. The process begins when a posting user 100 posts 105 a content item 110 on the social networking system. The social networking system is then able to accept requests from viewing users 120 to watch the content item, and the system can proceed to distribute 115 the content item to the viewing clients.

As the content distribution process 125 occurs, the social networking system collects and stores social information 130 about the interactions that are taking place. In one embodiment, this information 130 includes a list of connection objects 130A and a series of user profile objects 130B. Connection objects 130A describe all of the connections between the posting user 100, the viewing users 120, and any users or other entities that are tagged in the content item. As described above, connections between users may be formed with the consent of both users, whereas connections between a user and an activity page or some other non-user entity may be one-way and formed with the sole consent of the user. User profile objects 130B contain profile information for each user who interacts with the content item. Profile information includes information that is voluntarily provided by the user and information that is automatically generated by the social networking system based on the user's activities and interactions, as described above. In one embodiment, the social networking system collects location information and client device information as each user interacts with the content item 110 and adds the information to the corresponding user profile objects 130B. Other embodiments of the invention might collect and store additional and/or different information. Together, the social information 130 forms a comprehensive description of the social user activity surrounding the content item 110.

The content abuse prediction module 135 receives the social information 130 and uses it to predict whether the content item 110 contains copyrighted material or otherwise violates a policy of the social networking system. As discussed above, the social information may include connection objects 130A between the users and user profile objects 130B for each user. The content abuse prediction module 135 may use one or more algorithms to calculate social signals based on different aspects of the social information 130 that it receives. As the content abuse prediction module 135 analyzes more information, it may make internal adjustments to the weights placed on each of the social signals that it uses to calculate its prediction.

The content removal module 140 receives the prediction from the content abuse prediction module 135 and takes an appropriate action. If the content item is predicted to violate the social networking system's terms of use, then the content item is sent to a verification subprocess to confirm the violation. If the violation is confirmed, the content item is disabled and users of the social networking system will no longer be able to retrieve it. If the violation is not confirmed or the content item is not predicted to violate the system's terms, then the content item is allowed to stay online.

Figures 2A, 2B:
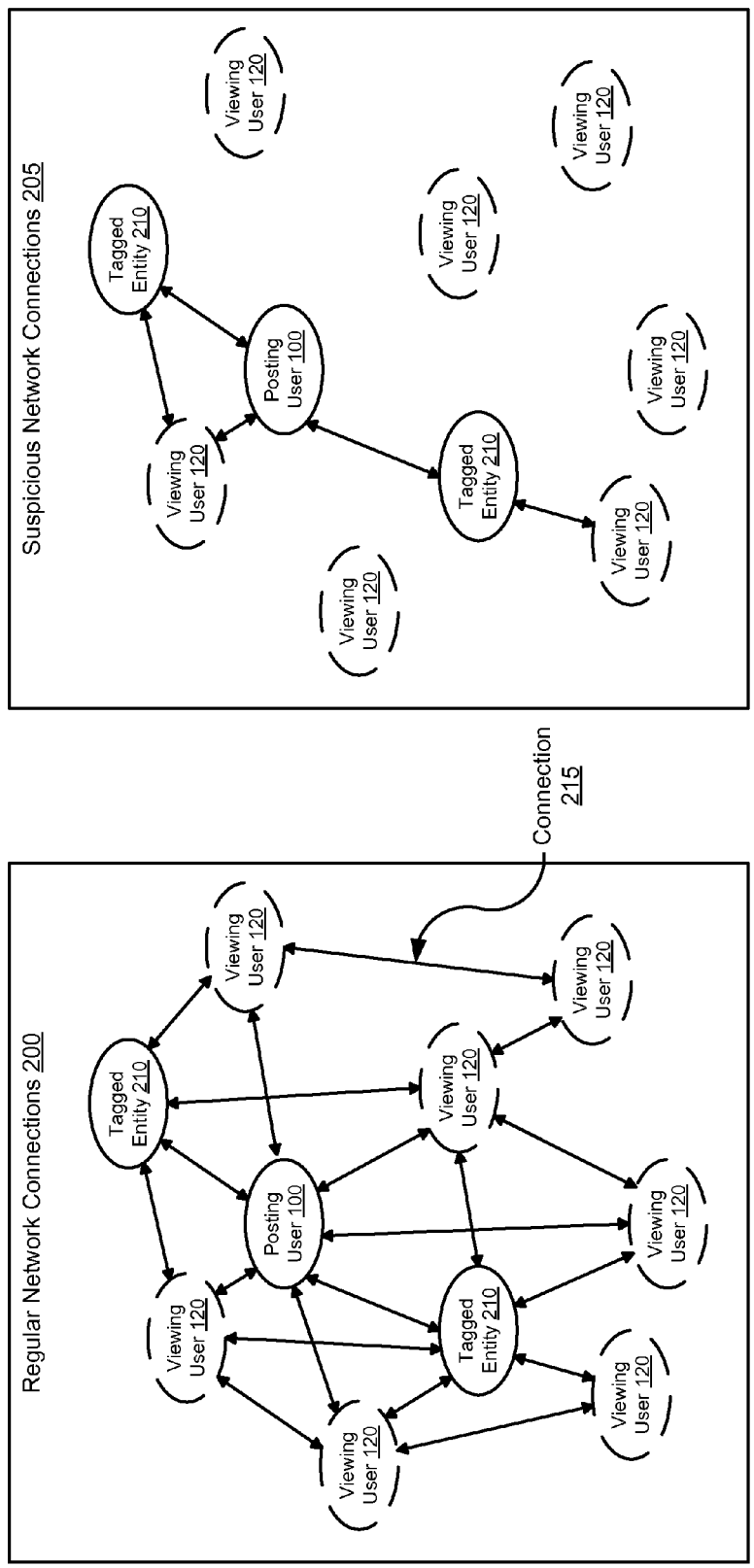
FIG. 2 is an example of the social connections between a group of users and entities that interact with a content item, in accordance with an embodiment of the invention.

FIG. 2A is an example of a social graph 200 surrounding an acceptable content item, in one embodiment. The posting user 100 is directly connected to most of the viewing users 120, and indirect connections connect the posting user to each of the remaining users. The tagged entities 210 are also connected to most of the viewing users. The tagged entities 210 may be any user of the social networking system, including the posting user or viewing user, or any non-user entity, such as a common interest page. The presence of so many connections between the posting user 100, the viewing users 120, and the tagged entities 210 indicates that all of the users who have interacted with the content item form a close group of friends on the social network, which increases the likelihood that they also form a real-life friend group. Content items shared within tightly connected groups like the one shown in FIG. 2A are more likely to contain personal user-generated content that has a real-life meaning to all of the viewing users. Examples of personal content include home videos featuring the posting user's friends, photographs taken at private social functions like parties and weddings, or personal messages that the posting user wishes to share with other users. This type of content is less likely to infringe on a copyright or otherwise violate the social networking system's terms of use.

FIG. 2B is an example of a social graph 205 surrounding a suspicious content item, in one embodiment. Although there are seven viewing users 120, the posting user 100 is only directly connected to one of them and has an indirect connection to only one more through a tagged entity 210. The other five viewing users are completely disconnected from the posting users. There are also very few connections between the viewing users 120 and the tagged entities 210. The lack of connections in this social graph is evidence that the content item is non-personal and widely publicized because the viewing users and the posting user are less likely to be real-life friends. Compared to personal content items that are surrounded by a dense network of social connections, widely publicized content items are more likely to contain copyrighted material or some other sort of abuse violation. For example, the users who view a content item containing a well-known television show or movie may not know (or be connected to) each other, but they are likely to be familiar with the well-known television show or movie.

In one embodiment, social signals based on the social connections between the posting user 100, the viewing users 120, and any tagged entities 210 comprise the primary basis of the predictions that are calculated by the content abuse prediction module 135. If there are extensive social connections between all of the entities that interact with the content item 110, then the prediction should not indicate a content violation. The content abuse prediction module 135 may also analyze other user information as part of the prediction calculation, such as the geographic distribution of the viewing users relative to the posting user, the client device information of each user, the common interests among the users, or the number of entities tagged in the content item.

System Architecture

Figure 3:
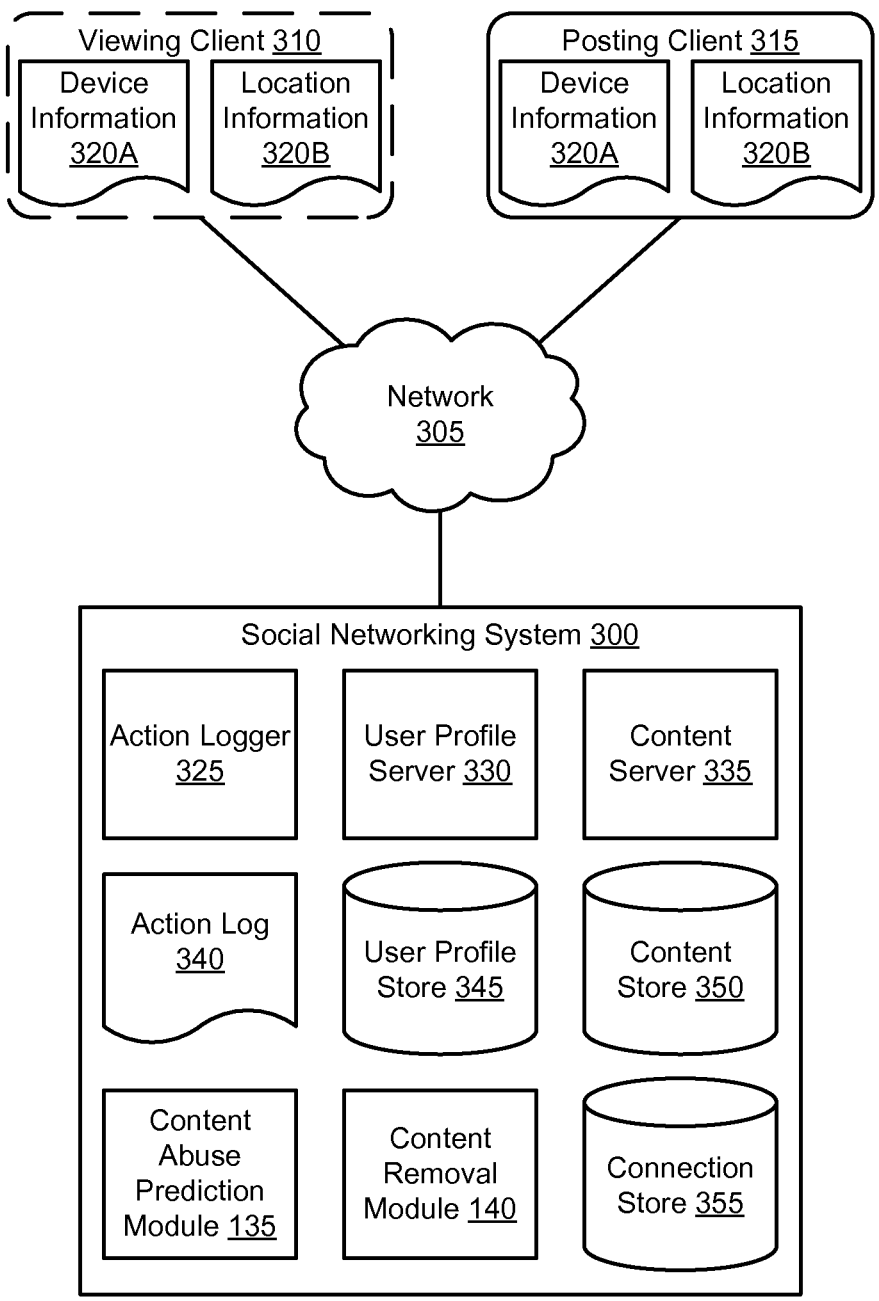
FIG. 3 is a network diagram of a system for predicting whether a content item on a social networking system violates the system's terms of use, showing a block diagram with components of the social networking system, in accordance with an embodiment of the invention.

FIG. 3 is a high-level block diagram illustrating a system environment suitable for predicting whether a content item on a social networking system violates the system's terms of use, in one embodiment. The system environment comprises a social networking system 300, a network 305, one or more viewing clients 310, and a posting client 315. Alternative embodiments might contain different and/or additional modules and components.

The posting client 315 and viewing client 310 may be any computing device that is capable of receiving and transmitting data through the network 305. In one embodiment, the client devices are conventional computing systems such as desktop or laptop computers. The users who operate these client devices may interact with the social networking system though a conventional web browsing application running on a desktop operating system. In another embodiment, the client devices may be mobile computing devices like tablet computers, mobile phones, or smart phones, which communicate with the social networking system via a native application on the client device. Users who operate portable client devices may thus interact with the social networking system through a portable web browser or native application, or even via a third party system that communicates with the social networking system an application programming interface (API).

The device information 320A contains information about the client device, including its hardware configuration, its operating system, and the web browser or application used to access the social networking system. Once the user starts using the client device to interact with the social networking system, the social networking system retrieves the device information 310A and stores it as part of the user's profile. In one embodiment, the client device may place the device information 310A in one location. In another embodiment, the device information 310A is saved in different locations on the client device and the social networking system gathers the information 310A into a single file before storing the information 310A in the user's profile. The location information 320B is the current location of the client device. Many techniques are available for determining the location of the client device, including identifying the IP address block of the client device or reading the output of the GPS module that is built into some mobile devices. It is also possible to determine the location of the client device using information that is already available on the user's profile. For example, some users voluntarily add their location information to their profiles, and the social network may also predict the user's location based on other profile information.

The client devices communicate with the social networking system through the network 305. In one embodiment, the network 305 comprises standard communication technologies and protocols. The network 305 might use link technologies such as Ethernet, 802.11, CDMA, 3G, 4G, or digital subscriber line (DSL). The networking protocols used on the network 305 might include the hypertext transfer protocol (HTTP), the transmission control protocol/internet protocol (TCP/IP), the file transfer protocol (FTP), the simple mail transfer protocol (SMTP), or the user datagram protocol (UDP). Data can be exchanged over the network 305 in formats such as the hypertext markup language (HTML) or the extensible markup language (XML). Any of the data that is transferred can be encrypted using technologies such as transport layer security (TLS), secure sockets layer (SSL), and internet protocol security (IPsec).

FIG. 3 also contains a high-level block diagram of the social networking system 300, in one embodiment. The social networking system 300 contains an action logger 325, a user profile server 330, a content server 335, an action log 340, a user profile store 345, a content store 350, the content abuse prediction module 135, the content removal module 140, and a connection store 355. In other embodiments, the social networking system 300 may include additional, fewer, or different components that perform other functions. Conventional components such as network interfaces, security functions, load managers, and backup servers are not included in the figure so as to not obscure the details of the system.

The action logger 325 records an action object every time a user interacts with the social networking system and saves those actions in the action log 340. For example, the action logger 325 saves an action object to the action log 340 whenever a user communicates with another user, posts comments or content items on the social networking system, views content items that have been posted on the social networking system, clicks on links to external domains, or views profiles of other users. The action logger 325 might also record action objects for other interactions that occur.

The user profile server 330 collects information about users and records it in the user profile store 345. The information collected by the user profile server 330 can be voluntarily supplied by users, collected from users' client devices, or automatically generated based on action objects that were recorded by the action logger 325. In particular, the user profile server 330 collects the device information 320A and location information 320B from each client and saves it as part of the corresponding user's profile in the user profile store 330. In alternative embodiments, the user profile server 330 might use additional, fewer, or different methods to collect profile information.

The content server 335 receives and processes requests to post and retrieve content items. When a posting user uses a posting client to post a content item on the social networking system, the request is received by the content server 335. The content server 335 may ask the posting user to provide some information about the content item, such as a title and/or a short description. The content server 335 may also give the posting user the option to tag users or entities in the content item to indicate that the content item has some sort of special relationship to the tagged entities. The posting user may decline to provide any of the information that the content server requests. The content server 335 saves the content item and any accompanying information in the content store 350 and makes it available for other users to retrieve and view. The action logger 325 records all of this activity as a series of action objects in the action log 340, and the user profile server 330 may analyze any information accompanying the video, including the title, description, tags, device information 320A, and location information 320B, and use the information to make corresponding updates to the posting user's profile in the user profile store 345.

When a viewing user uses the viewing client 310 to submit a request to retrieve a content item, the content server 335 retrieves the item and any accompanying information from the content store 350 and sends it through the network 305 to the viewing client 310. Again, the action logger 325 records the retrieval of the content item as an action object in the action log 340, and the user profile server 330 may analyze any information accompanying the video to make corresponding updates to the viewing user's profile in the user profile store.

The connection store 355 contains a record of the connections 215 that exist between users and other entities in the social graph. Requests to create new connections are processed by the action logger 325 and the connections are recorded in the connection store 355 once they are formed. As described above, connections between users may be formed once the action logger receives consent from both users, whereas connections between a user and a non-user entity may be formed immediately.

The content abuse prediction module 135 retrieves information from the user profile store 345 and the connection store 355 to predict whether a content item in the content store 350 infringes on property rights or otherwise violates a policy of the social networking system. The prediction is then sent to the content removal module 140. As discussed above, if the content item is predicted to be a violation, then the content removal module 140 will attempt to verify the violation. If the violation cannot be verified or the content is not predicted to be a violation, then no changes are made and the content item will remain available on the content store 350 for retrieval and viewing. If the violation is verified, then the content removal module 140 instructs the content server 335 to disable the content item so that viewers can no longer retrieve or view it. The content sever 335 may also delete the content item from the content store 340, or it may allow the content item to remain on the content store 340 for further analysis by administrators or other authorities.

Calculating Abuse Predictions for Content Items

Figure 4:
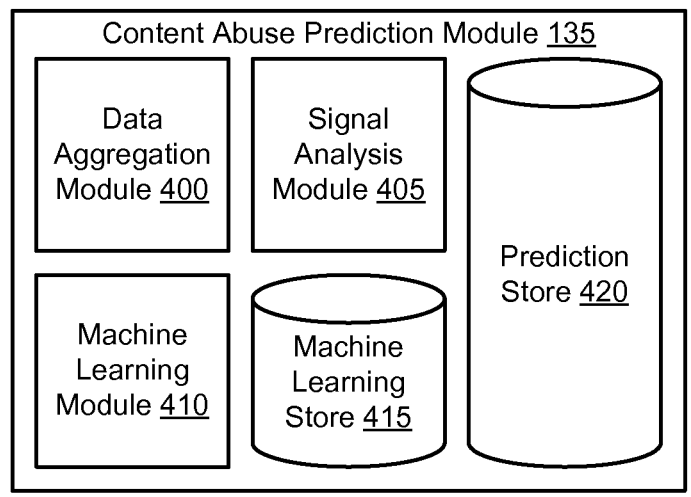
FIG. 4 is a high-level block diagram illustrating a content abuse prediction module for predicting whether a content item violates the terms of the social networking system, in accordance with an embodiment of the invention.

FIG. 4 is a high-level block diagram of the content abuse prediction module 135 in further detail. The content abuse prediction module 135 comprises a social signal generation module 400, a social signal analysis module 405, a machine learning module 410, a machine learning store 415, and a prediction store 420. Other embodiments of the invention may include additional and/or different modules and components that may interact with the components that are shown.

The data aggregation module 400 retrieves social data from the action log 340, the user profile store 345, and the connection store 355 and processes the data into a series of aggregate signals. The data may include any subset of the information in the user profile store 345 and the connection information store 355. In particular, the data may include social signals, such as the number of viewing users that are directly connected to the posting user, the number of viewing users that are indirectly connected to the posting user, the average length of the connection between the posting user and each viewing user, or the average geographical distance between the posting user and each viewing user. The data aggregation module 400 may also perform processing on analogous social signals between the viewing users and any entities tagged in the content item. The data aggregation module 400 may also use client device information for each user, additional user profile information, such as the geographic location of the user, and the number of shared connections among the viewing users to generate the series of aggregate signals. Each aggregate signal may be calculated using any combination of the data that the data aggregation module 400 retrieves. For example, the number of edges separating users in the social graph might be combined with the geographical separation between the users to calculate a single aggregate signal that provides a composite measure of the average distance between viewing users.

In one embodiment, the aggregate signals are unsigned numerical values ranging from 0 to 100, and the values are calculated so that higher values indicate a higher likelihood of a violation. For example, one signal might reflect the fraction of viewing users who are not connected to the posting user, expressed as a percentage value. As described in conjunction with FIG. 2, the lack of connections between the viewing users and the posting user may indicate that the content item is more likely to violate a policy of the social networking system, and the algorithm used to calculate this aggregate signal would be designed so the signal has a higher value when there are fewer connections between the viewing users and the posting user. For example, the algorithm to calculate this aggregate signal may compare the posting user's connections to other users (e.g., the posting user's friends) with the viewers who viewed or interacted with the posted content item (e.g., added comments or tags, shared the post, etc) and then calculate an aggregate signal that provides the fraction of the viewing users that are not connected to the posting user in the social graph (e.g., 60%). The value of the aggregate signal is higher when a larger fraction of viewing users are not friends of the posting user, which indicates that the posted content item is more likely to be a violation. Additional examples of aggregate signals are described with reference to FIG. 5. After the data aggregation module 400 calculates a series of aggregate signals, the signals are used as inputs for the signal analysis module 405.

The signal analysis module 405 receives aggregate signals from the data aggregation module 400 and uses an abuse prediction model to combine the aggregate signals into a single abuse prediction. In one embodiment, the abuse prediction model is defined in part by weights saved in the machine learning store 415. The weights are used to compute a weighted sum of the aggregate signals. The prediction that is calculated may be an unsigned numerical value with the same upper and lower limits as each of the social signals, where a higher value indicates a higher likelihood of a violation. In another embodiment, the abuse prediction is a binary value that may have an associated confidence score to quantify the strength of the prediction. In other embodiments, a different method may be used to calculate the abuse prediction. For example, the signal analysis module 405 may use more advanced techniques such as random forests or support vector machines (SVMs). Once the prediction is calculated, it is saved in the prediction store 420, where it can be retrieved by other modules.

The machine learning module 410 is used to train the abuse prediction model by adjusting the weights given to each aggregate signal that is generated in the data aggregation module 400. In one embodiment, a machine learning algorithm analyzes human feedback from users and administrators of the social networking system after a content item and corresponding prediction has been subject to their review.

The machine learning algorithm uses the human feedback to refine the parameters that are used to calculate some of the social signals and retrain the weights that are placed on each aggregate signal when the prediction is calculated. For example, if a content item is predicted to be a violation because a couple of aggregate signals for the content item were abnormally high, but human feedback indicates that the item is actually legitimate, then the machine learning algorithm might determine that those aggregate signals are less accurate and decrease their weights, or it might make some adjustments to the parameters that are used in the calculation of those aggregate signals. Any changes to parameters or weights are saved in the machine learning store 415 for future use by the social signal analysis module 405.

Figure 5:
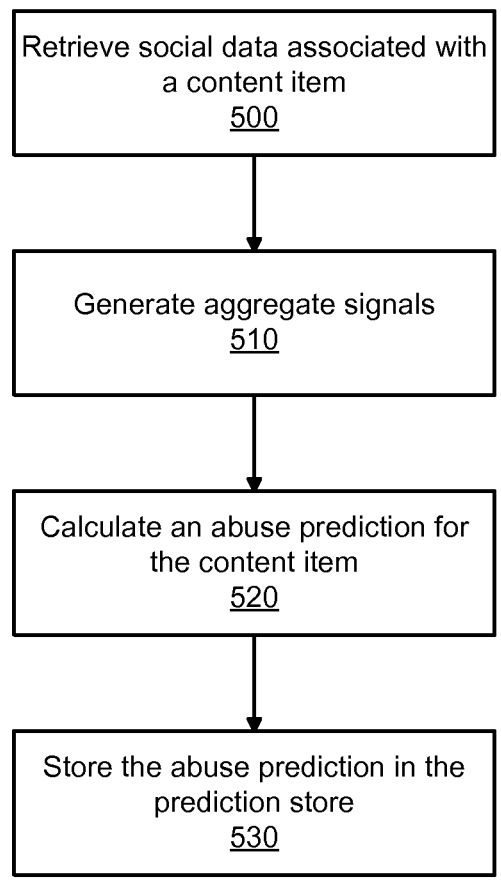
FIG. 5 is a flow chart of a process in which social information is used to predict whether the content item violates the system's terms of use, in accordance with an embodiment of the invention.

FIG. 5 is a flow chart of a process for calculating predictions for whether a content item violates the terms of the social networking system, in accordance with one embodiment of the invention. After a content item is posted, the content abuse prediction module 135 retrieves social data associated with users who interact with the content item from the action log 340, the user profile store 345, and the connection store 355. The social data may include social signals such as connections between individual users and connections between users and non-user entities, and the data may also include location information about users, entertainment preferences for each user such as preferred television shows or movies, web pages that users have visited, information about each user's client device, or written communications between users.

After the social data is received, the data aggregation module 400 uses the data to generate one or more aggregate signals 510. The aggregate signals are designed to quantify different aspects of the relationships among the users. For example, one signal might be designed to quantify the number of viewing users who are connected to the posting user. An algorithm to calculate the signal's value might establish a baseline so that any viewing user who is separated by more than two connections from the posting user is not considered to be connected to the posting user, or it might count all viewing users who are connected to the posting user but assign less weight to viewing users who are separated from the posting user by longer connections. Parameters such as the baseline connection length or the weights given to users who are separated by longer connections are saved in the machine learning store 410 and may be refined and updated by the machine learning module 415. All of the connection information is then combined into a single value to form the aggregate signal. The aggregate signal might be a bounded numerical value, an unbounded numerical value, a standalone binary value, a binary value with an accompanying confidence score, or any other quantitative data structure.

Another aggregate signal might attempt to use user profile information to identify common preferences among the viewing users. For example, an algorithm for calculating a signal might analyze the profiles of all the viewing users to determine whether a large fraction of the viewing users share an interest in the same movie or television show. A common interest among a large fraction of the viewing users indicates that the content item is likely to contain copyrighted content related to the movie or television show. The profile information used in this analysis may be voluntarily provided by the users or inferred by the social networking system 300 based on the user's actions and interactions that are recorded in the action log 330.

Aggregate signals may also be designed to directly detect user fraud. For example, one signal may measure the diversity of the client devices that are being used to interact with the content item. If there are anomalous similarities in the client devices of the viewing users (e.g., if the client device information is identical across a large group of viewing users), then the corresponding user accounts are more likely to be fraudulently generated accounts that are being instructed by an automated script to view a content item. A posting user might do this to artificially increase the activity around the content item and bring it to the attention of a larger number of potential viewers. An aggregate signal that is aimed at detecting this kind of automated user fraud would have an abnormally high value when a large number of similarly configured client devices attempt to retrieve the same content item.

Once the aggregate signals have been calculated, the signal analysis module 405 analyzes the aggregate signals and combines them to calculate a single abuse prediction 520. In one embodiment, the aggregate signals are combined in a weighted sum. The weights for each signal are retrieved from the machine learning store 415 and may be refined by the machine learning module 410 upon receiving user feedback regarding the accuracy of the prediction. Just as with the aggregate signals, the prediction may be a bounded numerical value, an unbounded numerical value, a standalone binary value, a binary value with an accompanying confidence score, or any other quantitative data structure. After the abuse prediction has been calculated 520, it is saved in the prediction store 530 and made available to other modules on the social networking system.

Dealing with Violations

Figure 6:
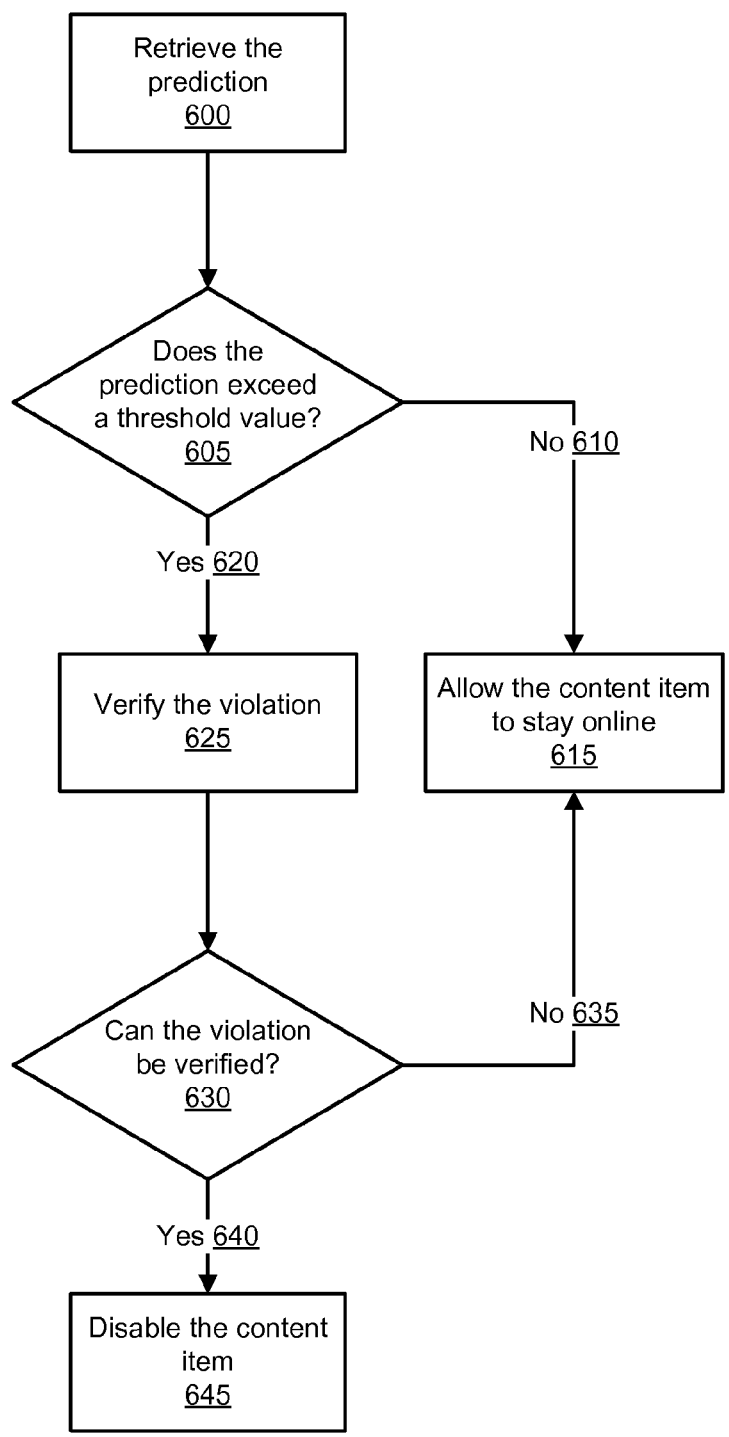
FIG. 6 is a flow chart of a process in which the prediction is used to decide whether the content item should be removed from the social networking system, in accordance with an embodiment of the invention.

FIG. 6 is a flow chart of a process for using content abuse predictions to determine whether the content item should be removed, in accordance with one embodiment of the invention. The content removal module 140 retrieves a prediction 600 from the prediction store 420 and compares it to a threshold value 605 that allows the content removal module 140 to interpret the prediction. The format of the threshold value depends on the format that was used to express the prediction. For example, if the prediction is a numerical value, then the threshold would be the value that divides violations and non-violations. If the prediction is a binary value, then the threshold would be the value corresponding to a violation. In some embodiments, the machine learning module 410 refines the threshold value as it receives more human feedback on the accuracy of the predictions that are calculated. In other embodiments, the threshold value may be a constant value that is set by the administrators of the social networking system.

If the prediction does not exceed the threshold value 610, then the content item is not predicted to contain copyrighted material or otherwise violate the social networking system's terms of use. In this case, the content item is allowed to stay online 615 and users will still be able to access it through the content server 335. The prediction can either be saved for archival, research, or other purposes, or it may be deleted from the prediction store to free up space.

If the prediction does exceed the threshold value 620, then the content item is predicted to violate the social networking system's terms of use and is sent to a process to verify the violation 625. The violation verification process may forward the content item to an administrator for manual review, ask users to vote on whether to remove the content item, or, in the case of an extremely strong prediction, simply verify the violation with no further examination. Other embodiments of the invention may use additional techniques to verify the violation. The violation verification process may also initiate several different verification techniques in parallel and then examine all of the results to generate a single decision.

Once the verification process is complete, the content removal module 140 reads the decision 630 and takes a final action on the content item. If the violation cannot be verified 635, then the content item is allowed to stay online 615 and users will continue to be able to retrieve it through the content server 325. If the violation is confirmed 640, then the content removal module 140 instructs the content server 325 to disable the content item 645 so that users can no longer retrieve it. The content item and all accompanying information like the title and description may be deleted from the content store 350 to free up storage space, or it may be preserved for archival purposes or for further investigation by administrators or other authorities. In some embodiments, the verification result and all of the prediction information are sent to the machine learning module 410 to refine the weights and other parameters that are used to calculate the aggregate signals and prediction.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method comprising:
    receiving a content item from a posting user on a social networking system;
    recording interactions of one or more viewing users with the posted content item, the recording interactions comprising recording connections between an entity that is tagged in the content item and one or more viewing users;
    computing a prediction of whether the posted content item violates a policy of the social networking system, where the prediction is based at least in part on a social signal selected from a group consisting of:
        a relationship between one or more of the viewing users and the posting user, and
        a relationship between one or more of the viewing users and another entity that is tagged in the posted content item;
    determining whether the content item is unauthorized content based on the computed prediction; and
    responsive to determining that the content item is unauthorized content, passing the content item to a process for violation processing of the content item.

2. The computer implemented method of claim 1, wherein receiving a content item from a posting user on a social networking system comprises:
    retrieving the content item from a client device operated by the posting user and storing it on the social networking system such that it can be retrieved by other users.

3. The computer implemented method of claim 1, wherein recording interactions of one or more viewing users with the posted content item comprises:
    recording the connections between the posting user and one or more viewing users.

4. The computer implemented method of claim 1, wherein recording interactions of one or more viewing users with the posted content item comprises:
    recording location information from the viewing client devices.

5. The computer implemented method of claim 1, wherein at least one of the social signals comprises:
    a value that measures a fraction of the viewing users who are connected to the posting user in the social networking system.

6. The computer implemented method of claim 1, wherein at least one of the social signals comprises:
    a value that measures a geographic distribution of the viewing users.

7. The computer implemented method of claim 1, wherein at least one of the social signals comprises:
    a value that measures anomalous similarities in the client devices of the viewing users.

8. The computer implemented method of claim 1, wherein the content item comprises a video file hosted on the social networking system.

9. The computer implemented method of claim 1, wherein the content item is hosted on a domain external to the social networking system.

10. The computer implemented method of claim 1, wherein the process for violation processing comprises:
receiving feedback from one or more additional users regarding whether the content item should be disabled.

11. The computer implemented method of claim 1, wherein the process for violation processing comprises:
displaying the content item to an administrator of the social networking system and receiving an indication from the administrator regarding whether the content item should be disabled.

12. The computer implemented method of claim 1, wherein a computer learning algorithm is used to calculate the prediction.

13. The computer implemented method of claim 1, wherein the content item is unauthorized content if the content item violates a policy of the social networking system.

14. The computer implemented method of claim 1, wherein the content item is unauthorized content if the content item contains copyrighted material.

15. The computer implemented method of claim 1, wherein the content item is unauthorized content if the content item contains abusive content.

16. A computer implemented method comprising:
receiving a content item from a posting user on a social networking system;
recording interactions of one or more viewing users with the posted content item, the recording interactions comprising recording connections between an entity that is tagged in the content item and one or more viewing users;
determining whether the posting user and one or more of the viewing users have established a connection in the social networking system;
computing a prediction of whether the posted content item contains copyrighted material based at least in part on one or more of the connections between the posting user and the viewing users;
determining whether the content item contains copyrighted material based on the computed prediction; and
passing the content item to a process for violation processing if the content item is determined to contain copyrighted material.

17. The computer implemented method of claim 16, wherein recording interactions of one or more viewing users with the posted content item comprises:
recording the connections between the posting user and one or more viewing users.

18. The computer implemented method of claim 16, wherein recording interactions of one or more viewing users with the posted content item comprises:
recording location information from the viewing client devices.

19. The computer implemented method of claim 16, wherein the prediction of whether the posted content item contains copyrighted material is additionally based at least in part on a geographic distribution of the viewing users.

20. A computer implemented method comprising:
receiving a content item from a posting user on a social networking system;
recording interactions of one or more viewing users with the posted content item, the recording interactions comprising recording connections between an entity that is tagged in the content item and one or more viewing users;
a step for predicting whether the posted content item violates a policy of the social networking system;
determining whether the content item is unauthorized content based on the step for predicting; and
passing the content item to a process for violation processing of the content item if the content item is determined to be unauthorized content.

21. The computer implemented method of claim 20, wherein recording interactions of one or more viewing users with the posted content item comprises:
recording the connections between the posting user and one or more viewing users.

22. The computer implemented method of claim 20, wherein recording interactions of one or more viewing users with the posted content item comprises:
recording location information from the viewing client devices.

23. The computer implemented method of claim 20, wherein the step of predicting is based at least in part on the fraction of the viewing users who are connected to the posting user in the social networking system.

24. The computer implemented method of claim 20, wherein the step of predicting is based at least in part on a geographic distribution of the viewing users.

* * * * *